(12) United States Patent
Bruhn et al.

(10) Patent No.: US 11,619,184 B2
(45) Date of Patent: Apr. 4, 2023

(54) METHOD FOR DETERMINING AN AIR MASS AND DIRECT WATER INJECTION SYSTEM

(71) Applicant: Bayerische Motoren Werke Aktiengesellschaft, Munich (DE)

(72) Inventors: Andreas Bruhn, Puchheim (DE); Bjoern Hussmann, Munich (DE); Marco Landwehr, Munich (DE); Dirk Linse, Munich (DE); Stefan Schott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/613,238

(22) PCT Filed: May 25, 2020

(86) PCT No.: PCT/EP2020/064437
§ 371 (c)(1),
(2) Date: Nov. 22, 2021

(87) PCT Pub. No.: WO2020/239691
PCT Pub. Date: Dec. 3, 2020

(65) Prior Publication Data
US 2022/0213843 A1 Jul. 7, 2022

(30) Foreign Application Priority Data
May 29, 2019 (DE) .................... 10 2019 114 494.9

(51) Int. Cl.
*F02D 19/12* (2006.01)
*F02M 25/022* (2006.01)
*F02M 25/03* (2006.01)

(52) U.S. Cl.
CPC ......... *F02D 19/12* (2013.01); *F02M 25/0224* (2013.01); *F02M 25/0227* (2013.01);
(Continued)

(58) Field of Classification Search
CPC ........... F02M 25/0224; F02M 25/0227; F02M 25/03; F02D 19/12; F02D 2200/04; F02D 2200/602
See application file for complete search history.

(56) References Cited

U.S. PATENT DOCUMENTS

| 5,203,822 A | 4/1993 | Guerich et al. |
| 9,599,003 B2 | 3/2017 | Hodgson et al. |

(Continued)

FOREIGN PATENT DOCUMENTS

| DE | 27 44 737 A1 | 4/1979 |
| DE | 32 19 499 A1 | 5/1983 |

(Continued)

OTHER PUBLICATIONS

PCT/EP2020/064437, International Search Report dated Aug. 27, 2020 (Three (3) pages).

(Continued)

*Primary Examiner* — Kevin A Lathers
(74) *Attorney, Agent, or Firm* — Crowell & Moring LLP

(57) ABSTRACT

A method for determining an air mass in an air separator of a water direct injection system for injecting a water/fuel mixture into a combustion chamber of an engine of a motor vehicle. The air separator is disposed between a water pump for delivering water of the water/fuel mixture and a high-pressure pump for feeding the water/fuel mixture to a (Continued)

high-pressure injector for injecting the water/fuel mixture into the combustion chamber. The method includes increasing a pressure of the water from a first pressure value to a second pressure value by the water pump, determining a water volume delivered by the water pump during the increasing of the pressure of the water by the water pump, and determining the air mass in the air separator on a basis of the determined water volume delivered by the water pump.

16 Claims, 1 Drawing Sheet

(52) U.S. Cl.
CPC ......... *F02M 25/03* (2013.01); *F02D 2200/04* (2013.01); *F02D 2200/602* (2013.01)

(56) References Cited

U.S. PATENT DOCUMENTS

| | | | |
|---|---|---|---|
| 9,771,849 B2 | 9/2017 | Hodgson et al. | |
| 2014/0166596 A1* | 6/2014 | Anderson | F02M 37/28 210/744 |
| 2015/0027357 A1* | 1/2015 | Liberg | B63B 13/00 114/125 |
| 2021/0190022 A1 | 6/2021 | Lauer | |

FOREIGN PATENT DOCUMENTS

| | | |
|---|---|---|
| DE | 40 11 422 A1 | 10/1991 |
| DE | 10 2009 056 181 A1 | 6/2011 |
| DE | 10 2010 004 201 A1 | 7/2011 |
| DE | 10 2012 107 430 A1 | 2/2014 |
| DE | 10 2013 218 552 A1 | 3/2015 |
| DE | 10 2014 222 463 A1 | 5/2016 |
| DE | 10 2015 218 838 A1 | 3/2017 |
| DE | 10 2016 216 235 A1 | 3/2018 |
| DE | 10 2017 219 369 A1 | 5/2019 |
| DE | 10 2017 219 371 A1 | 5/2019 |
| DE | 10 2018 201 564 A1 | 8/2019 |
| DE | 10 2018 203 805 A1 | 9/2019 |
| DE | 10 2018 204 551 A1 | 9/2019 |
| DE | 10 2018 206 884 A1 | 11/2019 |
| DE | 10 2018 114 358 A1 | 12/2019 |
| WO | WO 2016/177544 A1 | 11/2016 |
| WO | WO 2019/081115 A1 | 5/2019 |
| WO | WO 2019/121410 A1 | 6/2019 |

OTHER PUBLICATIONS

German Search Report issued in German application No. 10 2020 125 677.9 dated Jul. 6, 2021, with Statement of Relevancy (Eight (8) pages).

German-language Office Action issued in German application No. 10 2019 114 494.9 dated Apr. 14, 2020 (Four (4) pages).

* cited by examiner

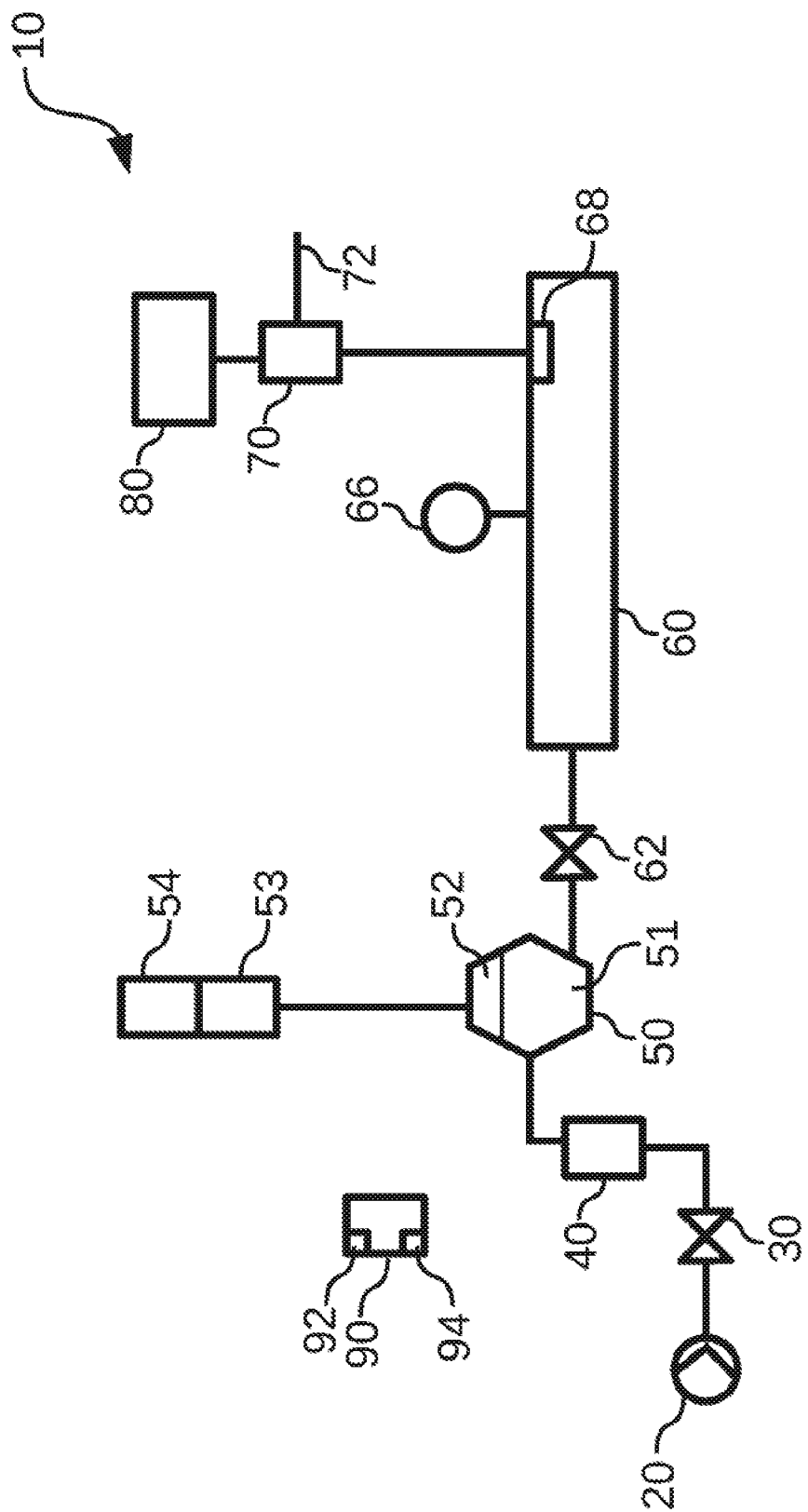

METHOD FOR DETERMINING AN AIR MASS AND DIRECT WATER INJECTION SYSTEM

BACKGROUND AND SUMMARY OF THE INVENTION

The technology disclosed here relates to a method for determining an air mass and to a water direct injection system.

With water injection, an air separator is arranged between a water pump for delivering water and a dosing module for dosing the water, which is introduced into the combustion chamber of an engine of a motor vehicle. The air separator has a number of functions, for example it is intended for damping pulsations, and for pushing water back through the (inactive) water pump when the engine is shut down.

When the engine is started, the air mass in the air separator is set to a predefined value through opening of an air valve and drawing-in and/or discharge.

In the case of prior art methods or systems, the air mass can decrease or increase over time, for example owing to leaks. Too much air in the air separator can lead to it being possible for air to pass into the high-pressure pump of the water direct injection system for introducing the water into the combustion chamber of the engine. Too little air in the air separator can lead to the filter not being freed or not being sufficiently freed of water by the air mass in the air separator when the engine is switched off.

A preferred object of the technology disclosed here is to reduce or to eliminate at least some disadvantages of the prior art solutions. Further preferred objects may arise from the advantageous effects of the technology disclosed here.

The object is achieved by a method for determining an air mass in an air separator of a water direct injection system for injecting a water/fuel mixture into a combustion chamber of an engine of a motor vehicle, wherein the air separator is arranged between a water pump for delivering the water and a high-pressure pump for feeding the water/fuel mixture to a high-pressure injector for injecting the water/fuel mixture into the combustion chamber, wherein the method comprises the following steps: increasing the pressure of the water from a first pressure value to a second pressure value by means of the water pump; determining the water volume delivered by the water pump during the increasing of the pressure of the water by means of the water pump; and determining the air mass present in the air separator on the basis of the determined water volume delivered by the water pump.

An advantage of this is that the air mass in the air separator can be determined in a technically simple manner. Moreover, for the determination of the air mass, there is no need for any further motors or pumps or the like beside the ones already present anyway. Moreover, no additional noises are generated in the motor vehicle. Consequently, introduction of air into the high-pressure pump, which can lead to damage to the high-pressure pump, can be reliably prevented. This increases the service life of the high-pressure pump.

In particular, the object is also achieved by a water direct injection system for injecting a water/fuel mixture into a combustion chamber of an engine of a motor vehicle, wherein the water direct injection system comprises the following: an air separator, a water pump for delivering water into the air separator, a water volume-determining apparatus for determining the water volume delivered by the water pump, a high-pressure pump for feeding the water/fuel mixture to a high-pressure injector for injecting the water/fuel mixture into the combustion chamber, and an air mass-determining apparatus for determining an air mass present in the air separator on the basis of the water volume delivered by the water pump, wherein the air separator is arranged between the water pump and the high-pressure pump.

An advantage of this is that the water direct injection system is of technically simple form and the air mass can be determined in a technically simple manner. Beside the water pump, which is required anyway, there is no need for any further active components or further pumps/motors, etc., for determining the air mass. Furthermore, the water direct injection system generates no additional noises during the determination of the air mass in the air separator. The water direct injection system reliably protects the high-pressure pump against the introduction of air. Consequently, the service life of the high-pressure pump is particularly long.

According to one embodiment of the method, the water volume delivered by the water pump during the increasing of the pressure of the water by means of the water pump from the first pressure value to the second pressure value is determined on the basis of the length of time required for the increasing of the pressure of the water from the first pressure value to the second pressure value. An advantage of this is that merely the elapsed length of time has to be determined. Consequently, the method is technically particularly simple. By means of the known delivery rate or pump power of the water pump, the water volume and consequently the air mass in the air separator can be determined in a technically simple manner.

According to one embodiment of the method, the water volume delivered by the water pump during the increasing of the pressure of the water by means of the water pump from the first pressure value to the second pressure value is determined on the basis of the number of pump cycles of the water pump during the increasing of the pressure of the water from the first pressure value to the second pressure value. An advantage of this is that merely the number of pump cycles, for example the number of revolutions, of the water pump has to be detected. From this, by means of the known delivery rate or pump power of the water pump, the water volume and consequently the air mass in the air separator can then be determined in a technically simple manner. Consequently, the method is technically particularly simple.

According to one embodiment of the method, the water volume delivered by the water pump during the increasing of the pressure of the water by means of the water pump from the first pressure value to the second pressure value is determined on the basis of the length of time of the operation of the water pump during the increasing of the pressure from the first pressure value to the second pressure value. An advantage of this is that the length of time of the operation of the water pump can be detected in a technically simple manner and consequently, by means of the delivery rate or pump power of the water pump, the water volume can be determined in a technically simple manner. Consequently, the method can be technically particularly simple.

According to one embodiment of the method, the water volume delivered by the water pump during the increasing of the pressure of the water by means of the water pump from the first pressure value to the second pressure value is determined on the basis of the detected current consumption of the water pump during the increasing of the pressure of the water from the first pressure value to the second pressure value. An advantage of this is that the water volume and consequently also the air mass in the air separator can be determined in a technically particularly simple manner, since the current consumption of the water pump during the increasing of the pressure is simple to detect. Consequently, the method is technically particularly simple.

According to one embodiment of the method, the pressure of the water is increased if the position of the accelerator pedal is changed at least by a predefined minimum distance. An advantage of this is that the air mass in the air separator is determined if an introduction of water into the combustion chamber of the engine is (probably) imminent. If the accelerator pedal is quickly pressed harder, a particularly large amount of power of the engine is required, so that water is introduced into the combustion chamber of the engine. Thus, the air mass in the air separator is checked shortly beforehand in this way.

According to one embodiment of the method, the method furthermore comprises the following steps: comparing the determined air mass present in the air separator with a predefined air mass value, and, if the determined air mass is lower than the predefined air mass value, increasing the air mass in the air separator for the purpose of reducing the difference between the determined air mass and the predefined air mass value, or, if the determined air mass is greater than the predefined air mass value, reducing the air mass in the air separator for the purpose of reducing the difference between the determined air mass in the air separator and the predefined air mass value. In this way, the air mass in the air separator is matched in a technically simple manner to the ideal air mass. Consequently, the possibility of air passing into the high-pressure pump is reliably prevented in a technically simple manner. Consequently, damage to the high-pressure pump is ruled out.

According to one embodiment of the method, a filter is arranged between the water pump and the air separator, and the air mass in the air separator is set to such an air mass value that, when the water/fuel mixture is introduced into the combustion chamber of the engine, no air passes into the high-pressure pump and, when the engine of the motor vehicle is switched off, the air mass in the air separator pushes water out of the filter at least partially in the direction of the water pump, in particular in such a way that, after the pushing of the water out of the filter by the air mass in the air separator, at least 30 percent by volume of the filter is freed of water. In this way, the air mass is set to such an ideal value that no air passes into the high-pressure pump, on the one hand, and the filter is made resistant to ice, or ice resistance of the filter is achieved, when the engine is switched off, on the other hand. Consequently, damage to the filter by frost after the engine has been switched off is prevented.

According to one embodiment of the method, after the engine has been switched off, it is checked whether the air mass in the air separator has freed a filter arranged between the water pump and the air separator of water by a predefined minimum percentage by volume of the filter, wherein, if the air mass in the air separator has freed the filter of water by less than the predefined minimum percentage by volume of the filter, water is extracted by suction from the filter by means of the water pump. An advantage of this is that it can be ensured in a technically simple manner that, after the engine has been switched off, the filter is ice resistant or the ice resistance protection of the filter is ensured. The minimum percentage by volume of the filter may for example be 30% or 40% of the volume of the filter.

According to one embodiment of the water direct injection system, the air mass-determining apparatus is configured for determining the water volume delivered by the water pump during the increasing of the pressure of the water by means of the water pump from the first pressure value to the second pressure value on the basis of the length of time required for the increasing of the pressure of the water from the first pressure value to the second pressure value. An advantage of this is that merely the elapsed length of time has to be measured by the water direct injection system to determine the air mass. Consequently, the water direct injection system requires no further components for determining the air mass. In this way, the water direct injection system is technically simple and inexpensive. By means of the known delivery rate or pump power of the water pump, the water volume and consequently the air mass in the air separator can be determined in a technically simple manner.

According to one embodiment of the water direct injection system, the air mass-determining apparatus is configured for determining the water volume delivered by the water pump during the increasing of the pressure of the water by means of the water pump from the first pressure value to the second pressure value on the basis of the number of pump cycles of the water pump during the increasing of the pressure of the water from the first pressure value to the second pressure value. An advantage of this is that the water volume delivered by the water pump can be determined in a technically simple manner since the delivered volume of each pump cycle is known. Consequently, the water direct injection system requires no further elements for determining the water volume. This lowers the production costs of the water direct injection system.

According to one embodiment of the water direct injection system, the air mass-determining apparatus is configured for determining the water volume delivered by the water pump during the increasing of the pressure of the water by means of the water pump from the first pressure value to the second pressure value on the basis of the length of time of the operation of the water pump during the increasing of the pressure from the first pressure value to the second pressure value. An advantage of this is that the water volume delivered by the water pump can be determined in a technically particularly simple manner, since merely the length of time of the operation of the water pump has to be detected. By means of the known delivery rate or pump power of the water pump, the delivered water volume can consequently be determined in a technically simple manner by the water direct injection system.

According to one embodiment of the water direct injection system, the water direct injection system furthermore comprises a filter which is arranged between the water pump and the air separator in such a way that air bubbles can rise up into the air separator from the filter. An advantage of this is that air can be removed in a technically simple manner from the water in the filter. In this way, passage of air into the high-pressure pump is prevented even more reliably.

According to one embodiment of the water direct injection system, the water direct injection system furthermore comprises a filter which is arranged between the water pump and the air separator, wherein the water direct injection system is configured in such a way that the air mass in the air separator can be set to such an air mass value that, when the water/fuel mixture is introduced into the combustion chamber of the engine, no air passes into the high-pressure pump and, when the engine of the motor vehicle is switched off, the air mass in the air separator pushes water out of the filter at least partially in the direction of the water pump, in particular in such a way that, after the pushing of the water out of the filter by the air mass in the air separator, at least 30 percent by volume of the filter is freed of water. An advantage of this is that the water direct injection system can set the air mass in such a way that no air passes into the high-pressure pump, on the one hand, and the filter is made resistant to ice, or ice resistance of the filter is achieved, when the engine is switched off, on the other hand. In this way, damage to the filter by frost after the engine has been switched off can be reliably prevented by means of the water direct injection system.

The water may be a mixture of water and a further liquid (for example alcohol). This means that when the term "water" is used, a mixture or a solution of water and a further liquid, for example alcohol, is always also possible. The alcohol may in particular be methanol and/or ethanol. The water may for example be a mixture or a solution of 50% water and 50% methanol or of 10% water and 90% methanol.

The technology disclosed here will now be explained on the basis of a FIGURE.

BRIEF DESCRIPTION OF THE DRAWING

The FIGURE shows a schematic view of an embodiment of the water direct injection system.

DETAILED DESCRIPTION OF THE DRAWING

The FIGURE shows a schematic view of an embodiment of the water direct injection system 10 according to the invention.

The water direct injection system 10 comprises a water pump 20 for pumping or delivering water, a filter 40 for filtering the water, an air separator 50 and a high-pressure pump 70.

The water direct injection system 10 is configured for injecting a fuel/water mixture into the combustion chamber of a motor vehicle. The motor vehicle may be a passenger car, a truck, a bus, a motorcycle, an aircraft, a train or a boat. By means of the water, the temperature in the combustion chamber can be reduced, so that the power of the engine 80 is increased. Moreover, the fuel consumption can be reduced in this way.

A "tank shut-off valve" 30 for shutting off the connecting line between the water pump 20 and the filter 40 is arranged between the water pump 20 and the filter 40. The filter 40 is arranged between the tank shut-off valve 30 and the air separator 50. The air separator 50 is arranged between the filter 40 and the dosing module 60. The dosing module 60 has an engine shut-off valve 62 for shutting off the connecting line between the air separator 50 and the dosing module 60. The dosing module 60 is arranged between the air separator 50 and the high-pressure pump 70. The high-pressure pump 70 receives water from the dosing module 60 and fuel and generates a high pressure of the fuel/water mixture, which is injected into the combustion chamber by high-pressure injectors (not shown). The high-pressure pump 70 feeds the highly pressurized fuel/water mixture to the high-pressure injector and/or to the high-pressure injectors.

The air separator 50 has in the upper half a connecting line with an aeration valve 53. This connecting line consequently connects an air mass in the air separator 50 to the aeration valve 53. The aeration valve 53 is connected to the ambient air via an aeration valve filter 54.

The dosing module 60 has a pressure limiter or pressure accumulator. The pressure limiter may comprise for example a piston which is loaded by way of a spring. The dosing module 60 moreover comprises a dosing valve 68. The dosing valve 68 controls the amount of water that flows from the dosing module 60 to the high-pressure pump 70. Fuel moreover flows into the high-pressure pump 70 through the fuel line 72. The dosing module 60 moreover comprises a pressure sensor 66 which detects the pressure of the water in the dosing module 60. The temperature of the water can moreover be detected.

The water direct injection system 10 furthermore comprises a control apparatus 90. The control apparatus 90 may comprise the water volume-determining apparatus 92 and the air mass-determining apparatus 94. The control apparatus 90 is connected by wire/line or wirelessly to the further parts of the water direct injection system 10. The control device controls or regulates the different elements of the water direct injection system 10.

The pressure of the water in the air separator 50 is increased by the water pump 20 from a first pressure value to a second pressure value. During the increasing of the pressure, the air mass which is present in the air separator 50 (including the line to the aeration valve 53) is determined. The air mass is measured for example in grams or kilograms. For this purpose, the air mass-determining apparatus 94 uses the water volume delivered by the water pump 20 or the volume of water which was delivered during the increasing of the pressure from the first pressure value to the second pressure value. The air mass which is present in the air separator 50 can be determined from the difference between the second pressure value and the first pressure value and the water volume which was delivered so as to achieve this pressure difference.

The air volume displaced by way of increase of pressure from delivered water corresponds to the delivered water volume. The pressure of the air corresponds to the pressure of the water. Consequently, the air mass can be determined or calculated in a technically simple manner.

Here, the temperature of the air can be assumed to be constant. Alternatively, the temperature can be additionally detected.

The water volume-determining apparatus 92 determines the water volume which is delivered by the water pump 20 during the increasing of the pressure of the water from the first pressure value to the second pressure value. This can be carried out by one of the following possibilities or by a combination of the following possibilities:

detecting the length of time of the operation of the water pump 20, that is to say the length of time the water pump 20 was operated to increase the pressure from the first pressure value to the second pressure value, detecting the length of time which elapses during the increasing of the pressure of the water from the first pressure value to the second pressure value, that is to say how long it takes to increase the pressure from the first pressure value to the second pressure value, detecting the current consumption of the water pump 20, that is to say how much current and/or power the water pump 20 consumed while the water pump 20 increased the pressure from the first pressure value to the second pressure value, and/or detecting the pump cycles or the number of revolutions of the water pump 20, that is to say how many cycles the water pump 20 completed to increase the pressure from the first pressure value to the second pressure value.

The delivery rate of the water pump 20 (that is to say, how many $m^3$ are delivered by the water pump 20 per second) is typically known. The delivery rate of the water pump 20 as a function of the current consumption may likewise be known.

The aeration valve 53 is closed during the determination of the water volume during the increasing of the pressure of the water from the first pressure value to the second pressure value.

In this way, the water volume-determining apparatus 92 can determine or calculate the water volume delivered by the water pump 20. From this, the air mass-determining apparatus 94 can determine the air mass in the air separator 50.

The determined air mass can be compared with a predefined air mass value (for example a particular number of milliliters or number of milligrams of air). If the determined air mass is lower than the predefined air mass value, the water pump 20 can be operated in reverse, that is to say water is delivered from the air separator 50, and the aeration valve 53 opened, so as to bring such an amount of additional air into the air separator 50 that the predefined air mass value is achieved. If the determined air mass is greater than the predefined air mass value, the aeration value 53 can be opened so as to match or adapt, by way of partial or complete equalization of pressure between the surroundings and the air separator 50, the air mass in the air separator 50 to the predefined air mass value.

When the engine 80 is started, the (positive) pressure of the water is increased from 0 bar to 4 bar or 5 bar. It is also possible for the (positive) pressure of the water to be increased from 0 bar to 4 bar or 5 bar only if the engine 80 and/or the catalytic converter has reached or exceeded a predefined minimum temperature and/or the vehicle has reached or exceeded a predefined minimum speed. Consequently, in the case of a short distance traveled or a low speed, the pressure of the water is not increased. The latter prevents the operation of the water pump from being perceived by the vehicle occupants.

After the increase in pressure from 0 bar to 4 bar or 5 bar, the water direct injection system 10 is in the "ready" state. If it is expected that, within a predefined period of time (for example within the next 5 seconds), an introduction of fuel/water mixture into the combustion chamber of the engine 80 of the motor vehicle is to take place, the pressure is increased from 4 bar or 5 bar to approximately 9 bar by means of the water pump 20. When the pressure of the water is increased, the air mass in the air separator 50 is compressed.

Consequently, the first pressure value may for example be 0 bar, 4 bar or 5 bar. The second pressure value may for example be 4 bar, 5 bar or 9 bar.

Fuel/water mixture is introduced into the combustion chamber of the engine 80 of the motor vehicle for example if the accelerator pedal of the motor vehicle has been pressed harder or changed by at least a minimum distance within a predefined period of time.

When the engine 80 is switched off, the air mass in the air separator 50 pushes the water back in the direction of the water pump 20 or through the water pump 20 and thereby at least partially empties the filter 40. In particular, in this way, it is possible for the filter 40 to be emptied of water by at least 30 percent by volume of the filter 40. This makes the filter 40 resistant to ice, which protects the filter 40 against frost damage.

It is possible for it to be checked, after the engine 80 has been switched off, whether the air mass in the air separator 50 has pushed the water out of the filter 40 to such an extent that a predefined minimum percentage by volume, for example 30% or 40% or 50%, of the filter 40 has been freed or emptied of water or is filled with air. This can be established for example by analysis of the pressure profile of the water or of the air in the air separator 50 when the engine 80 is switched off. It is also possible for this to be established by liquid sensors in the filter 40.

If the predefined minimum percentage by volume is not or has not been reached (frequently because an insufficient amount of air was present in the air separator 50), that is to say, after the water has been pushed back by the air mass in the air separator 50, more than the predefined minimum volume (for example 30% or 40% of the volume) of the filter 40 is still filled with water, the water pump 20 can be operated for the purpose of pumping water out of the filter 40. The water pump 20 can be operated for a predefined time and/or the water pump 20 can be operated until a predefined volume of water has been extracted by suction from the filter 40 by way of the water pump 20. During the extraction by suction of the water from the filter 40 by means of the water pump 20, the aeration valve 53 may be opened or open, so that no negative pressure in relation to the surroundings is formed in the air separator 50. In this way, protection of the filter 40 against ice pressure is ensured.

The filter 40 is arranged below the air separator 50 in such a way that air bubbles can rise up into the air separator 50 from the filter 40. Consequently, it is ensured even more reliably that no air passes to the high-pressure pump 70.

The air mass in the air separator 50 results inter alia in the damping of pulsations of the water.

The water volume delivered by the water pump 20 corresponds to the displaced compressed air mass.

The filter 40 may be a fine filter.

The air separator 50 is filled with water 51 or air to different degrees, or by different percentages, according to the pressure of the air in the air separator or the pressure of the water.

The air mass in the air separator 50 is typically not only determined or set when the engine 80 is started, but is checked, or set, again when the pressure is increased. Consequently, the air mass can be set to the correct value or be corrected even if leaks are present and the air mass has therefore decreased or increased during the operation of the engine 80.

While the pressure of the water is being increased, the engine shut-off valve 62 is normally open. The pressure of the water in the air separator 50 is detected.

The water is delivered by the water pump 20 from a water tank (not shown).

For the sake of legibility, the expression "at least one" has in some cases been omitted for simplicity. Where a feature of the technology disclosed here is described in singular or indefinite terms (for example the/an air separator 50, the/a filter 40, the/a water pump 20, the/a high-pressure pump 70, etc.), this is at the same time also intended to disclose a plurality thereof (for example the at least one air separator 50, the at least one filter 40, the at least one water pump 20, the at least one high-pressure pump 70, etc.).

The above description of the present invention serves merely for illustrative purposes and not for the purpose of limiting the invention. Within the context of the invention, various alterations and modifications are possible without departing from the scope of the invention and of its equivalents.

LIST OF REFERENCE CHARACTERS

10 Water direct injection system
20 Water pump

30 Tank shut-off valve
40 Filter
50 Air separator
51 Water in the air separator
52 Air in the air separator
53 Aeration valve
54 Aeration valve filter
60 Dosing module
62 Engine shut-off valve
66 Pressure sensor
68 Dosing valve
70 High-pressure pump
72 Fuel line
80 Engine
90 Control apparatus
92 Water volume-determining apparatus
94 Air mass-determining apparatus

What is claimed is:

1. A method for determining an air mass in an air separator (50) of a water direct injection system (10) for injecting a water/fuel mixture into a combustion chamber of an engine (80) of a motor vehicle, wherein the air separator (50) is disposed between a water pump (20) for delivering water of the water/fuel mixture and a high-pressure pump (70) for feeding the water/fuel mixture to a high-pressure injector for injecting the water/fuel mixture into the combustion chamber, comprising the steps of:
   increasing a pressure of the water from a first pressure value to a second pressure value by the water pump (20);
   determining a water volume delivered by the water pump (20) during the increasing of the pressure of the water by the water pump (20); and
   determining the air mass in the air separator (50) on a basis of the determined water volume delivered by the water pump (20).

2. The method according to claim 1, wherein the water volume delivered by the water pump (20) during the increasing of the pressure of the water by the water pump (20) is determined on a basis of a length of time required for the increasing of the pressure of the water from the first pressure value to the second pressure value.

3. The method according to claim 1, wherein the water volume delivered by the water pump (20) during the increasing of the pressure of the water by the water pump (20) is determined on a basis of a number of pump cycles of the water pump (20) during the increasing of the pressure of the water from the first pressure value to the second pressure value.

4. The method according to claim 1, wherein the water volume delivered by the water pump (20) during the increasing of the pressure of the water by the water pump (20) is determined on a basis of a length of time of an operation of the water pump (20) during the increasing of the pressure from the first pressure value to the second pressure value.

5. The method according to claim 1, wherein the water volume delivered by the water pump (20) during the increasing of the pressure of the water by the water pump (20) is determined on a basis of a detected current consumption of the water pump (20) during the increasing of the pressure of the water from the first pressure value to the second pressure value.

6. The method according to claim 1, wherein the pressure of the water is increased when a position of an accelerator pedal is changed at least by a predefined minimum distance.

7. The method according to claim 1, further comprising the steps of:
   comparing the determined air mass in the air separator (50) with a predefined air mass value; and
   when the determined air mass is lower than the predefined air mass value, increasing the air mass in the air separator (50) to reduce a difference between the determined air mass and the predefined air mass value;
   when the determined air mass is greater than the predefined air mass value, reducing the air mass in the air separator (50) to reduce the difference between the determined air mass and the predefined air mass value.

8. The method according to claim 1, wherein:
   a filter (40) is disposed between the water pump (20) and the air separator (50) and wherein the air mass in the air separator (50) is set to an air mass value that:
   when the water/fuel mixture is introduced into the combustion chamber of the engine (80), no air passes into the high-pressure pump (70); and
   when the engine (80) of the motor vehicle is switched off, the air mass in the air separator (50) pushes water out of the filter (40) at least partially in a direction of the water pump (20) such that, after pushing of the water out of the filter (40) by the air mass in the air separator (50) at least 30 percent by volume of the filter (40) is freed of water.

9. The method according to claim 1, wherein after the engine (80) has been switched off, checking whether the air mass in the air separator (50) has freed a filter (40) disposed between the water pump (20) and the air separator (50) of water by a predefined minimum percentage by volume of the filter (40), and wherein, when the air mass in the air separator (50) has freed the filter (40) of water by less than the predefined minimum percentage by volume of the filter (40), extracting water by suction from the filter (40) by the water pump (20).

10. A water direct injection system (10) for injecting a water/fuel mixture into a combustion chamber of an engine (80) of a motor vehicle, comprising:
    an air separator (50);
    a water pump (20), wherein water of the water/fuel mixture is deliverable by the water pump (20) into the air separator (50);
    a water volume-determining apparatus (92), wherein a water volume delivered by the water pump (20) is determinable by the water volume-determining apparatus (92);
    a high-pressure pump (70), wherein the water/fuel mixture is feedable by the high-pressure pump (70) to a high-pressure injector for injecting the water/fuel mixture into the combustion chamber, and
    an air mass-determining apparatus (94), wherein an air mass in the air separator (50) is determinable by the air mass-determining apparatus (94) on a basis of a water volume delivered by the water pump (20);
    wherein the air separator (50) is disposed between the water pump (20) and the high-pressure pump (70).

11. The water direct injection system (10) according to claim 10, wherein the air mass-determining apparatus (94) is configured to determine the water volume delivered by the water pump (20) during an increasing of a pressure of the water by the water pump (20) from a first pressure value to a second pressure value on a basis of a length of time required for the increasing of the pressure of the water from the first pressure value to the second pressure value.

12. The water direct injection system (10) according to claim 10, wherein the air mass-determining apparatus (94) is configured to determine the water volume delivered by the water pump (20) during an increasing of a pressure of the water by the water pump (20) from a first pressure value to a second pressure value on a basis of a number of pump cycles of the water pump (20) during the increasing of the pressure of the water from the first pressure value to the second pressure value.

13. The water direct injection system (10) according to claim 10, wherein the air mass-determining apparatus (94) is configured to determine the water volume delivered by the water pump (20) during an increasing of a pressure of the water by the water pump (20) from a first pressure value to a second pressure value on a basis of a length of time of an operation of the water pump (20) during the increasing of the pressure from the first pressure value to the second pressure value.

14. The water direct injection system (10) according to claim 10, further comprising a filter (40) which is disposed between the water pump (20) and the air separator (50) such that air bubbles rise up into the air separator (50) from the filter (40).

15. The water direct injection system (10) according to claim 10, further comprising a filter (40) which is disposed between the water pump (20) and the air separator (50);
wherein the water direct injection system (10) is configured such that an air mass in the air separator (50) is settable to an air mass value that:
when the water/fuel mixture is introduced into the combustion chamber of the engine (80), no air passes into the high-pressure pump (70); and
when the engine (80) of the motor vehicle is switched off, the air mass in the air separator (50) pushes water out of the filter (40) at least partially in a direction of the water pump (20) such that, after pushing of the water out of the filter (40) by the air mass in the air separator (50) at least 30 percent by volume of the filter (40) is freed of water.

16. A motor vehicle, comprising:
the water direct injection system (10) according to claim 10.

* * * * *